United States Patent

[11] 3,611,861

[72] Inventor  Karl Peter Schulze
                Carrum, Victoria, Australia
[21] Appl. No. 847,003
[22] Filed     July 29, 1969
[45] Patented  Oct. 12, 1971
[73] Assignee  Illinois Tool Works Inc.
                Chicago, Ill.
[32] Priority  July 31, 1968
[33]           Australia
[31]           41478/68

[54] MOUNTING CLIPS OR FASTENERS
     5 Claims, 4 Drawing Figs.
[52] U.S. Cl. .................................................. 85/5, 85/80
[51] Int. Cl. .................................................. F16b 19/00
[50] Field of Search .......................................... 85/5, 80

[56]           References Cited
          UNITED STATES PATENTS
2,836,215  5/1958  Rapata ..................... 85/80
2,853,913  9/1958  Rapata ..................... 85/5
2,713,284  7/1955  Bedford .................... 85/5
            FOREIGN PATENTS
1,103,760  6/1955  France ..................... 85/5

Primary Examiner—Edward C. Allen
Attorneys—Robert W. Beart, Michael Kovac, Barry L. Clark and Jack R. Halvorsen ABSTRACT: The invention is in an improved mounting clip or fastener for conveniently and quickly securing apertured members together. The clip or fastener has a headed shank or body adapted to be inserted into apertured members, said shank having shouldered resilient arms adapted to engage inner and outer apertured members into which the clip has been inserted to prevent retraction of the clip from the apertured members.

PATENTED OCT 12 1971

3,611,861

INVENTOR
Karl Peter Schulze
BY
His Att'ys

MOUNTING CLIPS OR FASTENERS

This invention relates to mounting clips or fasteners for securing apertured members together.

In industrial assemblies it is necessary to mount or fasten apertured members together by means of rivets of various kinds or screws and nuts which can entail relatively costly manual operations such as for example the securing of plates or brackets to other members or in one particular case the securing of a refrigerator compressor mounting bracket through a shock mounting bush to a chassis or panel member.

The principal object of the present invention is to provide a mounting clip or fastener of convenient and economical construction adapted to simplify and reduce costs in industrial assembly operations.

According to the present invention a mounting clip or fastener for securing apertured members together includes a shank portion adapted to be inserted into apertures in members to be connected together, said shank having at one end thereof a head portion of greater diameter than the shank, one or more first retaining lugs or arms formed on said shank and normally extending outwardly in inclination to the shank and towards said head, said first lug or arms being adapted to retain the clip or fastener in engagement with one or more apertured members to be connected together by the clip, a shouldered nose portion at the other end of the shank, said nose portion being slotted to form two or more further resilient lugs or arms adapted by the shoulders thereon to retain apertured members on the shank of the clip or fastener.

The clip or fastener is preferably made as a moulding of plastic material, such as Acetal resin, having required strength, rigidity and resiliency for the operation of the lugs or arms.

In one embodiment a clip or fastener for securing a refrigerator compressor mounting bracket through a shock mounting bush to a chassis or panel member, comprises a shank portion adapted to be inserted into apertures in the mounting bracket, bush and chassis, a head portion at one end of the shank having a greater diameter than the shank, two retaining lugs or arms formed on the shank one on each opposite side thereof and normally extending outwardly in inclination to the shank and towards said head and adapted upon the shank being inserted into the aperture in the chassis to abut the inner surface of the chassis and effect engagement of the head portion with the outer surface of the chassis to secure the clip thereto, a shouldered nose portion at the other end of the shank, and a medial slot in said nose portion in a plane normal to said lugs or arms thereby forming two further resilient lugs or arms which latter are adapted to retain the shock mounting bush and mounting bracket on the chassis.

In order that the invention may be more readily understood reference will now be made to the accompanying drawings illustrating a mounting clip constructed according to the present invention. In the drawings.

Figure 1:
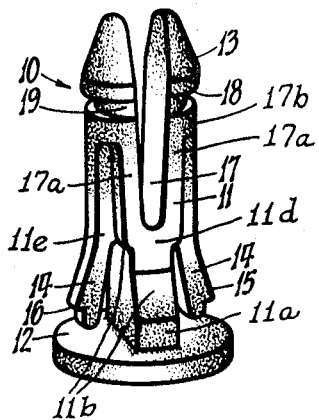
FIG. 1 is a perspective view of the mounting clip.
Figure 2:
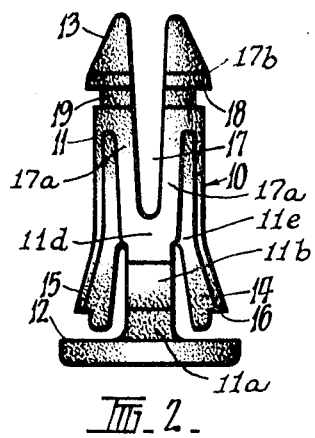
FIGS. 2 and 3 are front and side elevations respectively of the clip.
Figure 3:
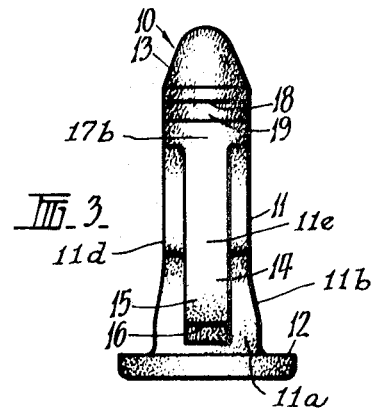

The clip indicated generally at 10 in the drawings comprises a shank or body portion 11 having at one end a flanged head 12 of greater diameter than the shank and at the other end a nose portion 13. Adjacent to the flanged head 12 the shank 11 includes a first rigid portion 11a substantially rectangular in cross section. The shank blends inwardly, as at 11b, along the major dimension of portion 11a; and outwardly along the minor dimension of portion 11a, to a horizontally disposed bridging or cruciform second portion 11c which is generally crosslike in section. One of the arms 11d of the cross is aligned with the major dimension of rectangular portion 11a and forming a continuation of the blended portion thereof. The second arm 11e of the cross is disposed at right angles to the first arm and preferably has a dimension substantially equal to the major dimension of the rectangular portion 11a and forms a crossbar or T-like cross section in an axial plane perpendicular to said major dimension.

A pair of integral resilient retaining lugs or arms 14 normally extend generally axially from the ends of crossarm 11e and angularly outwardly in spaced inclination to the shank towards the flanged head 12. The outer ends 15 of the lugs 14 are shouldered as at 16 to engage the inner edges of an aperture 27 through which the shank 11 is passed.

The shank 11 is medially slotted at 17 in an axial plane containing the major dimension of portion 11a and normal to the plane in which the lugs 14 are resiliently moveable. The slot extends from crossbar portion 11c through the nose portion 13 to form a second pair of resilient lugs or arms 17a. The two arms 17a in combined section form a generalized extension of the cruciform portion 11c and individually are generally T-shaped in cross section. The crosses of the T's are in opposition on opposite sides of slot 17 with stems of the T's serving as reinforcing ribs with the oppositely extending extremities thereof having a dimension substantially equal to the aperture dimension and thereby serving as positive guide means during insertion into the aperture. The stems of the T's are general continuations of the arm 11e of the cruciform portion 11c and blend into the first pair of arms 14. Adjacent the free ends of each arm they blend into a semicircular portion 17b. The nose portion 13 is formed as a split cone, each portion having a base shoulder 18 forming one face of a circumferential groove 19 in the shank 11 while the ends of semicircular portions 17b form the other face of groove 19. Preferably base shoulder 18 presents a slightly larger diameter than semicircular portion 17b.

The clip 10 is formed, preferably as a moulding of a plastic material such as an acetal resin or other similar material which is relatively rigid but has limited flexibility. The flexibility of the lugs 14 and lug in the shank 11 formed by the slot 17 enable them to be compressed towards each other permitting the shank to be passed through an aperture of smaller diameter than that of the head 12.

Figure 4:
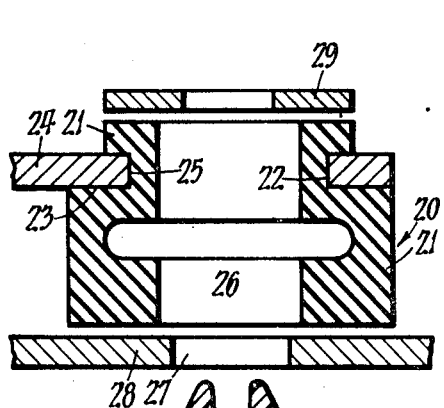
FIG. 4 is an exploded view in section of the parts of a compressor shock mounting assembly including the clip shown in FIGS. 1, 2 and 3.
Figure 4:
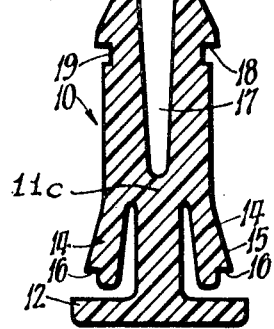
Figure 5:
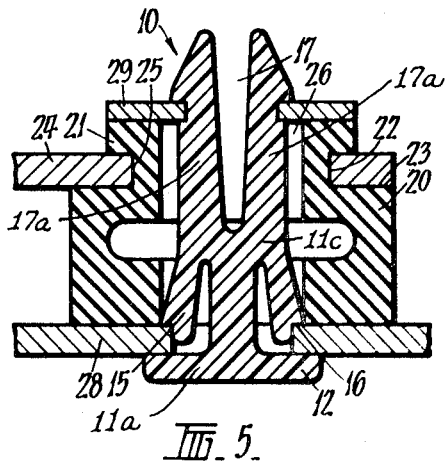
FIG. 5 is similar sectional view of the completed assembly.

As illustrated in FIGS. 4 and 5 the clip 10 is shown in use as a mounting or locating clip for a compressor shock mounting bush 20 comprising a rubber or like apertured grommet 21 having an outer circumferential groove 22 therein forming a support shoulder 23 for a compressor mounting bracket 24 having an aperture 25 therein to receive the grommet 21. The grommet aperture 26 is aligned with an aperture 27 in a chassis or panel 28, the aperture 27 being of smaller diameter than the head 12 on the clip 10, the shank 11 of which is passed through aperture 27 and into the grommet aperture 26. The lugs 14 on the clip 10 are compressed in passing through the aperture 27 and resume normal position so that shouldered ends 16 seat upon the inner edges of said aperture as shown in FIG. 5 to thereby locate the clip in position and prevent retraction thereof. The cruciform cross-sectional combined shape of the arms 17a tend to balance the insertion of the fastener within aperture 27 and the rigid portion 11a serves as a positive locating means and shear post means to retain the clip in combination with lugs 14 in a generally positive relationship to aperture 27.

Over the projecting nose 13 of the clip 10 is fitted a supporting washer 29 which is forced down over the tapering nose to snap engage in the groove 19 behind the shoulder 18 to thereby provide a compressive force on the grommet 21 and firmly hold the compressor bracket 24 in position.

The clip 10 enables the compressor shock mounting bush members to be quickly and readily assembled and by compressing the nose sections together the washer 29 can be released to permit the compressor bracket 24 and grommet 21 to be removed while the clip 10 remains in position for reassembly.

It will be apparent that the assembly and attachment of a refrigerator compressor to a chassis or panel can be readily and quickly effected with the mounting clip above described in that the required number of clips 10 are inserted in apertures 27 and located therein by arms 14, the compressor mounting brackets 24 with previously inserted mounting bushes 20 therein are lowered onto the located clips 10 and finally secured in position by snapping washers 29 over the protruding nose portions 13 of the clips 10.

The clip 10 as illustrated may be modified in the length of shank 11 and formation of shoulder 18 to enable the economical mounting or fastening together of other apertured members in a wide range of other industrial assemblies.

What I claim is:

1. A one piece plastic fastener for securing apertured members together including a shank adapted to be inserted into said apertures and a head at one end of said shank having a diameter greater than said shank, said shank including a first noncircular solid rigid portion adjacent said head and a second generally cruciform noncircular bridging portion extending laterally from opposite sides of said first portion, a pair of resilient arms normally extending from said second portion toward said head and diverging outwardly in spaced inclination to said first portion, a second pair of resilient arms extending from said second portion in the opposite direction away from said head and terminating in a shouldered substantially circular tapered nose portion, said second pair of arms having a combined cross-sectional configuration through a substantial portion of their extent which is a diverging split continuation of said noncircular second portion while the balance of the length of said arms blends into a generally cylindrical cross-sectional configuration adjacent said nose portion, with the noncircular portion generally lying within the parameters of said shouldered circular tapered nose portion configuration.

2. A fastener as claimed in claim 1 and wherein the arms extending towards the head portion are shouldered at their outer ends to engage the inner edge of an aperture in one of the members into which the shank of the clip is inserted.

3. A fastener of the type claimed in claim 1 wherein said first rigid portion is substantially rectangular in cross section with the major dimension thereof being cooperatively accepted by said aperture to serve as a positive center locating and shear means.

4. A fastener of the type claimed in claim 3 wherein said nose portion has a conical form, the base of said conical form serving as a shoulder means carried by said second pair of arms.

5. A fastener of the type claimed in claim 3 wherein said second pair of arms are each substantially T-shaped in cross section with the cross of the T's in opposition, the stems of the T's serving as reinforcing ribs with the extremities defining a dimension substantially equal to the aperture dimension for guide purposes during insertion therein.